United States Patent Office 2,833,820
Patented May 6, 1958

2,833,820

**PROCESS FOR THE PREPARATION OF ISOPH-
THALIC AND TEREPHTHALIC ACIDS**

Robert B. Egbert, Roslyn Heights, David Brown, New York, and Alfred Saffer, Bayside, N. Y., assignors to Mid-Century Corporation, Chicago, Ill., a corporation of Delaware No Drawing. Application June 14, 1957
Serial No. 665,650

15 Claims. (Cl. 260—524)

This invention relates to a process for the catalytic oxidation of meta-diisopropylbenzene or para-diisopropylbenzene by means of air or other molecular oxygen containing gaseous material to produce isophthalic acid or terephthalic acid respectively wherein the catalyst is a heavy metal compound, and more particularly to such a process wherein the catalyst is an organic carboxylic salt of manganese. The invention relates especially to such a process conducted in the presence of water at an elevated pressure and a non-acid organic liquid, wherein the ratio of non-acid is in the range of 1 to 10 parts per part by weight of the diisopropylbenzene.

Isophthalic acid is a commercially highly desirable intermediate for preparing polyester type resins, such as the polyesters prepared from isophthalic acid and glycerol and isophthalic acid and pentaethrythritol among others. Terephthalic acid is also a commercially highly desirable intermediate for the preparation of polyester resins, especially the polyesters useful in the preparation of textile fibers such as polymeric ethylene glycol terephthalate. For either isophthalic or terephthalic acid to be available for the preparation of polyesters, they must be capable of production in a readily economic manner. Many uses of these two dicarboxylic acids require that they be readily produced in an economic manner as a relatively pure product. In other uses mixtures of isophthalic acid and terephthalic acid not only are useful but also are highly desirable.

It has been found, in accordance with the invention, that high purity isophthalic and high purity terephthalic acid can be prepared in a very convenient and economic manner by the oxidation of meta-diisopropylbenzene or para-diisopropylbenzene respectively by means of molecular oxygen in the presence of manganese carboxylate, especially a manganese salt of a monocarboxylic acid containing 2 to 10 carbon atoms, and in the presence of a certain amount of water at an elevated pressure and also in the presence of a non-acid liquid, using a ratio of organic liquid in the range of 1 to 10 parts per part by weight of the diisopropylbenzene.

The objects achieved in accordance with the invention as described herein include the provision of a process for obtaining high purity isophthalic acid or terephthalic acid or mixtures thereof in an economic and convenient manner by the reaction of molecular oxygen with meta-diisopropylbenzene or para-diisopropylbenzene or mixtures thereof in the presence of a heavy metal compound, preferably a manganese carboxylate salt as the catalyst, and in the presence of water at an elevated pressure and also in the presence of a non-acid organic liquid; the provision of such a process wherein the reaction is carried out in the presence of a liquid water phase; and other objects which will be apparent as details of embodiments of the invention are hereinafter set forth.

In order to facilitate a clear understanding of the invention, the following preferred specific embodiments are described in detail.

*Example I*

Into a suitable pressure reactor having a corrosion resistant inner surface (e. g., glass, ceramic or corrosion resistant metal or alloy), equipped with agitating means such as a mechanical agitating device or gas flow agitating means, and with means for heating or cooling the contents thereof such as a coil or jacket, a condenser for refluxing non-aqueous condensate and some or all of the water to the reaction vessel, a gas inlet tube, and a valved vent for passing off inert gases and low boiling materials, there are charged:

125 parts by weight of meta-diisopropylbenzene (90% meta)
10 to 100 parts of water
250 parts of a chlorinated biphenyl material having a boiling range of 275 to 320° C. (A. S. T. M. method D-20)
3.75 parts of manganese cumate The reaction vessel is about half filled with the liquid mixture.

Substantially pure oxygen is passed into the reaction mixture at the rate of 120 liters (measured at atmospheric pressure and about 27° C.) per hour, some gas being passed out through the vent system, while the reaction mixture is maintained at 200° C., with vigorous agitation for 9 hours. The pressure is maintained at about 300 to 400 p. s. i. g.; the pressure being such that the reaction mixture contains a liquid water phase.

The crude solid isophthalic acid in the mixture is separated by filtration, and washed with benzene, using about 10 parts per part acid by weight. Alternatively, it may be given three washings with about 100% lower carboxylic acid, e. g., acetic acid, each washing being with about 300 parts by weight of the acid per 40 parts of the precipitate, and then given three washings with water, using approximately similar amounts. The washings are recycled in the next run. The acid used herein may be that which is condensed and recovered from the vent gases from the reactor.

A yield of 20 to 90% by weight of crude isophthalic acid of about 50 to 90% or more purity is obtained, based on the meta-diisopropylbenzene charged.

In analogous runs carried out under similar conditions except using cobalt cumate as the catalyst, the crude isophthalic acid yield is much lower and the acid product is dark in color and of relatively poor quality.

*Example II*

Into a reaction vessel as described in Example I there are charged:

125 parts by weight of para-diisopropylbenzene (90% para and 10% meta)
10 to 100 parts of water
250 parts of a chlorinated biphenyl material having a boiling range of 275 to 320° C. (A. S. T. M. method D-20)
3.75 parts of manganese cumate The reaction vessel is about half filled with the liquid mixture.

Substantially pure oxygen is passed into the reaction mixture at the rate of 120 liters (measured at atmospheric pressure and about 27° C.) per hour, some gas being passed out through the vent system, while the reaction mixture is maintained at 200° C., with vigorous agitation, for 9 hours. The pressure is maintained at about 300 to 400 p. s. i. g.; the pressure being such that the reaction mixture contains a liquid water phase.

The crude solid terephthalic acid in the mixture is separated by filtration, given three washings with about 100% acetic acid, each washing being with about 300 parts by weight of acetic acid per 40 parts of the precipitate, and then given three washings with water, using approximately similar amounts. The acetic acid washings are distilled, leaving a residue containing crude isophthalic acid.

The distillation is continued until the temperature reached 139° C. at 1-2 mm. Hg pressure for a first cut. The distillation is then continued up to a temperature of 250° C. at 1-2 mm. Hg. The residue remaining in the distillation vessel is resinous and carbonaceous. The distillate cuts may be recycled to the reactor, e. g., in the next run.

Desirable results are obtained, generally a yield in the range of 20 to 90% by weight of crude terephethalic acid, of about 50 to 90% or more purity, based on the para-diisopropylbenzene charged.

*Example III*

Into a reaction vessel as described in Example I there is charged:

125 parts by weight of a mixture of meta- and para-diisopropylbenzenes containing a ratio of about 2.0 mols of para-diisopropylbenzene per mol of meta-diisopropylbenzene
10 to 100 parts by weight of water
250 parts of a chlorinated biphenyl material having a boiling range of 275 to 320° C. (A. S. T. M. method D-20)
3.75 parts by weight of manganese cumate The reaction vessel is about half filled with the reaction mixture.

Substantially pure oxygen is passed into the reaction mixture at the rate of 120 liters (measured at atmospheric pressure and about 27° C.) per hour, some gas being passed out through the vent system, while the reaction mixture is maintained at 200° C., with vigorous agitation, for 9 hours. The pressure is maintained at about 300 to 400 p. s. i. g.; the pressure being such that the reaction mixture contains a liquid water phase.

The mixture of solid isophthalic acid and solid terephthalic acid in the resulting reaction medium is recovered by filtration. A combined yield of isophthalic acid and terephthalic acid up to about 90% can be obtained by this process based on the diisopropylbenzene charged. Isophthalic acid can be separately recovered by extraction of the solid product with acetic acid as described in Example II or by converting the entire solid product to a monoester such as the monomethyl ester and fractionally distilling the mixture of monomethyl esters. Isophthalic acid can also be separated by converting the mixed acids to mixed salts and separating the salts.

The process may be conducted in a batch, intermittent or a continuous manner.

Desirable results are achieved with various modifications of the foregoing, such as the following. The pressure should be sufficient to maintain the reaction mixture sufficiently saturated with water, e. g., a water content of at least about 10% of saturation, preferably the pressure is sufficiently high to have an excess of water present, i. e., a liquid water phase, meta-diisopropylbenzene and water or para-diisopropylbenzene and water being substantially not mutually soluble. Generally, the pressure is in the range of 100 to 1500 p. s. i. g. (pounds per square inch gauge).

The non-acid solvent may be any aromatic or aliphatic compound boiling in the range of 50 to 450° C. at atmospheric pressure and stable under the reaction conditions. These may be typified by halogenated, e. g., chlorinated polyphenyls, especially chlorinated biphenyls boiling in the range of 275 to 430° C. and liquid at about 25° C., biphenyl, diphenyl ether, and naphthalene. Mixtures thereof may be used.

The reaction temperature may be in the range of 150 to 275° C., desirably 175 to 250° C., and preferably 200 to 225° C. The reaction temperature and pressure are interrelated, and a particular combination thereof is selected so as to maintain the desired amount of liquid water in the reaction system. The reaction temperature may be regulated by adjusting the pressure so as to allow heat of reaction to be removed by volatilization of water. Water vapor may be removed from the system, passed through the reflux condenser to condense this vapor, an amount of water returned to the reactor to maintain the desired water concentration or liquid aqueous phase. The water formed during the reaction may be discarded from the system.

The reaction time may be in the range of 0.5 to 50 or more hours, the actual reaction time being sufficient to obtain a desirable yield of isophthalic acid from meta-diisopropylbenzene or of terephthalic acid from the para-diisopropylbenzene. Generally, higher reaction temperatures and corresponding pressures are reflected in shorter reaction times to give comparable yields of the desired products.

The manganese carboxylate catalyst may be the manganese salt of any carboxylic acid, which salt is finely dispersed in the reaction system, desirably a mono-carboxylic acid of 2 to 10 carbon atoms, and preferably the salt of an acid formed in the reaction system. Unique results may be obtained with such catalysts.

The metal carboxylate catalysts may be prepared by reacting the metal oxide or other compound with the appropriate acid in known manner. For higher acids they may be prepared by dissolving the appropriate organic acid in caustic, and then adding thereto an aqueous solution of the appropriate metal acetate. The desired metal carboxylate salt forms a precipitate, in the case of the carboxlic acids higher than acetic. The precipitate is separated by filtration, thoroughly washed with water, air dried, and then dried over calcium chloride under low pressure. For instance, manganese cumate may be prepared by dissolving 20 grams of cumic acid in 100 cc. of 5% by weight aqueous sodium hydroxide. A solution of 15 grams of manganese acetate dissolved in 75 cc. of water is gradually added thereto, with agitation. The manganese cumate precipitate which forms is separated by filtration, thoroughly washed with water, air dried, and then dried over calcium chloride under low pressure. An about 90% yield of the catalyst is obtained. The manganese cumate prepared in this manner is soluble in meta-diisopropylbenzene; e. g., to a concentration of 0.1% by weight. However, if the manganese cumate is oven dried at about 80° C. or higher for several hours, it tends to darken, and the darkened salt is much less soluble in meta-diisopropylbenzene.

Representative manganese salts of monocarboxylic acids containing 2 to 10 carbon atoms which can be used in the process of this invention include but are not limited to manganese acetate, manganese propionate, manganese butyrate, manganese benzoate, manganese toluate, manganese salicylate and manganese cumate. Of these representative manganese salts, the manganese salts of the aromatic acids are preferred.

The amount of catalyst used may be in the range of 0.1 to 5% by weight based upon the weight of meta-diisopropylbenzene or para-diisopropylbenzene fed into the reaction mixture, desirably 1 to 3; i. e., containing 0.2 to 2% of the metal.

The oxygen used may be in the form of substantially 100% oxygen gas or in the form of gaseous mixtures containing lower concentrations of oxygen, e. g., down to about 20%, such as in air. Where the gaseous mixture contains a relatively lower concentration of oxygen, a correspondingly higher pressure or flow rate of the gas should be used, in order that a sufficient amount (or partial pressure) of oxygen is actually fed into the reaction mixture.

The ratio of oxygen fed into the reaction mixture relative to the diisopropylbenzene is in the range of 9 to 100 or more mols of oxygen per mol of diisopropylbenzene, desirably in the range of 10 to 50, and preferably in the range of 10 to 15.

The meta-diisopropylbenzene fed into the reactor may be in the form of any technically pure mixture free from contaminants or materials which may interfere with the oxidation. Generally, the mixture may contain some para-diisopropylbenzene and also some lower or higher alkylated benzenes. It may also contain some saturated aliphatic hydrocarbon material which is relatively resistant to oxidation in the system. For best results, substantially pure meta-diisopropylbenzene should be used, e. g., 99 to 100%.

The para-diisopropylbenzene fed into the reactor may be in the form of any technically pure mixture free from contaminants or materials which may interfere with the oxidation. Generally, the mixture may contain some meta-diisopropylbenzene and also some lower or higher alkylated benzenes. It may also contain some saturated aliphatic hydrocarbon material which is relatively resistant to oxidation in the system. For best results, substantially pure para-diisopropylbenzene should be used, e. g., 99 to 100%.

The reaction temperature, reactant concentration, catalyst and its concentration, reaction time and yield of product are interrelated. Generally, higher temperatures are reflected in shorter reaction times, as are more active catalysts. Too high temperatures or too severe conditions tend to give somewhat poorer product. The particular combination of reaction mixture composition and reaction conditions used should be selected with a view to obtaining the best output of desired quality product.

This application is a continuation-in-part of our copending applications Serial No. 343,495, filed March 19, 1953, and Serial No. 360,822, filed June 10, 1953, both now abandoned.

Other materials may be present during the oxidation reaction, providing they do not interfere with the desired reaction.

In view of the foregoing discussions, variations and modifications of the invention will be apparent to one skilled in the art, and it is intended to include within the invention all such variations and modifications except as do not come within the scope of the appended claims.

We claim:

1. A process for preparing a member selected from a class consisting of isophthalic acid and terephthalic acid which comprises reacting a member of a class consisting of meta-diisopropylbenzene and para-diisopropylbenzene with molecular oxygen in the presence of a catalytic amount of a manganese salt of a monocarboxylic acid containing 2 to 10 carbon atoms and a non-acid organic liquid boiling in the range of 50 to 450° C., and stable under the reaction conditions, and in the presence of water in an amount such that the reaction mixture is at least 10% saturated with water at a temperature in the range of 150 to 275° C., and at a pressure in the range of 100 to 1500 p. s. i. g. such that a liquid phase of organic compound is maintained.

2. A process for preparing terephthalic acid which comprises reacting para-diisopropylbenzene with molecular oxygen in the presence of a catalytic amount of a manganese salt of a monocarboxylic acid containing 2 to 10 carbon atoms and a non-acid organic liquid boiling in the range of 50 to 450° C., and stable under the reaction conditions, and in the presence of water in an amount such that the reaction mixture is at least 10% saturated with water at a temperature in the range of 150 to 275° C., and a pressure in the range of 100 to 1500 p. s. i. g. such that a liquid phase of organic compound is maintained.

3. A process of claim 2 wherein the catalyst is a manganese salt of an aromatic monocarboxylic acid containing up to 10 carbon atoms.

4. A process of claim 2 wherein the reaction mixture contains 0.1 to 5% of the catalyst based on the weight of the para-diisopropylbenzene.

5. A process of claim 2 wherein the catalyst is manganese cumate.

6. A process of claim 2 wherein the combination of pressure and temperature is such that a liquid water phase is also maintained in the reaction system.

7. A process of claim 2 wherein the organic liquid is a chlorinated biphenyl material boiling in the range of 275 to 320° C.

8. A process of claim 2 wherein the organic liquid is selected from the group consisting of biphenyl, diphenyl ether, naphthalene, and chlorinated polyphenyls boiling in the range of 275 to 430° C. and liquid at about 25° C.

9. A process for preparing isophthalic acid which comprises reacting meta-diisopropylbenzene with molecular oxygen in the presence of a catalytic amount of a manganese salt of a monocarboxylic acid containing 2 to 10 carbon atoms, a non-acid organic liquid boiling in the range of 50 to 450° C. and stable under the reaction conditions, and in the presence of water in an amount such that the reaction mixture is at least 10% saturated with water, at a temperature in the range of 150 to 275° C. and a pressure in the range of 100 to 1500 p. s. i. g. such that a liquid phase of the organic compound is maintained.

10. A process of claim 9 wherein the organic liquid is selected from the group consisting of biphenyl, diphenyl ether, naphthalene and chlorinated polyphenyls boiling in the range of 275 to 430° C. and liquid at about 25° C.

11. A process of claim 9 wherein the catalyst is a manganese carboxylate.

12. A process of claim 9 wherein the reaction mixture contains 0.1 to 5% of the catalyst based on the weight of the meta-diisopropylbenzene.

13. A process of claim 9 wherein the catalyst is manganese cumate.

14. A process of claim 9 wherein the combination of amount of water, pressure and temperature is such that a liquid water phase is maintained in the reaction system.

15. A process of claim 9 wherein the organic liquid is a chlorinated biphenyl material boiling in the range of 275 to 320° C.

References Cited in the file of this patent

UNITED STATES PATENTS

| | | |
|---|---|---|
| 1,902,550 | Forrest et al. | Mar. 21, 1933 |
| 2,276,774 | Henke et al. | Mar. 17, 1942 |
| 2,302,462 | Palmer et al. | Nov. 17, 1942 |
| 2,479,067 | Gresham | Aug. 16, 1949 |
| 2,578,654 | Hearne et al. | Dec. 18, 1951 |
| 2,723,994 | Haefele et al. | Nov. 15, 1955 |

FOREIGN PATENTS

| | | |
|---|---|---|
| 623,836 | Great Britain | May 24, 1949 |
| 681,455 | Great Britain | Oct. 22, 1952 |
| 1,017,881 | France | Oct. 1, 1952 |

OTHER REFERENCES

Ipatieff et al.: J. Am. Chem. Soc., vol. 58 (1936), pages 921–922.

Newton: J. Am. Chem. Soc., vol. 65 (1943), pages 321–322.